Aug. 30, 1949.  M. D. WELSH  2,480,431
COMBINED PARKING STAND AND BRAKE FOR BABY CARRIAGES
Filed March 20, 1947  2 Sheets-Sheet 1

INVENTOR
MATILDA D. WELSH
BY John H. Cassidy
ATTORNEY

Aug. 30, 1949.  M. D. WELSH  2,480,431
COMBINED PARKING STAND AND BRAKE FOR BABY CARRIAGES
Filed March 20, 1947  2 Sheets-Sheet 2

INVENTOR
MATILDA D. WELSH

BY *John N. Cassidy*
ATTORNEY

Patented Aug. 30, 1949

2,480,431

UNITED STATES PATENT OFFICE 2,480,431

COMBINED PARKING STAND AND BRAKE FOR BABY CARRIAGES

Matilda D. Welsh, St. Louis, Mo.

Application March 20, 1947, Serial No. 735,853

3 Claims. (Cl. 188—20)

This invention relates to baby carriages, generally, and concerns itself more particularly with a combined parking stand and brake therefor.

In the development of the art, brakes have been provided for baby carriages which apply a braking force to at least one of its wheels. Retractable parking stands have also been proposed which are designed to elevate a portion of the carriage and support it in a parked position on a surface over which the carriage passes. As separate mechanisms, the brake must be set with one operation and the parking stand must be lowered with another. In the case of the parking stands, which represent the prior art devices, they require no small amount of effort to put them in operative position and usually they are retracted by a lifting action applied by the toe of the foot. With the advent of the toeless shoe, the use of these stands has become objectionable since their operation causes injury to the ladies' toes, or, if the top of the shoe is used, to the finish of the shoe. Moreover, both the brakes and the parking stands of the prior art devices are easily released by small children and are, therefore, not entirely safe.

Accordingly, it is a general object of this invention to overcome these disadvantages.

More specifically, it is an object of this invention to provide a combined parking stand and brake for a baby carriage which is placed in position to perform its dual functions with a single operation.

Further, it is an object of the invention to provide a retractable parking stand for a baby carriage which is adapted to be lowered into parking position by the ball of the foot and which is capable of being retracted through forces applied in like manner.

Another object of the invention is to provide a combined parking stand and brake for a baby carriage which may not be released by irresponsible persons, such as small children.

A still further object of the invention is to provide a combined parking stand and brake for a baby carriage which is easily operated, is simple in construction, economical to manufacture and is universally adaptable to all types and makes of carriages through simple attachments.

Figure 1:
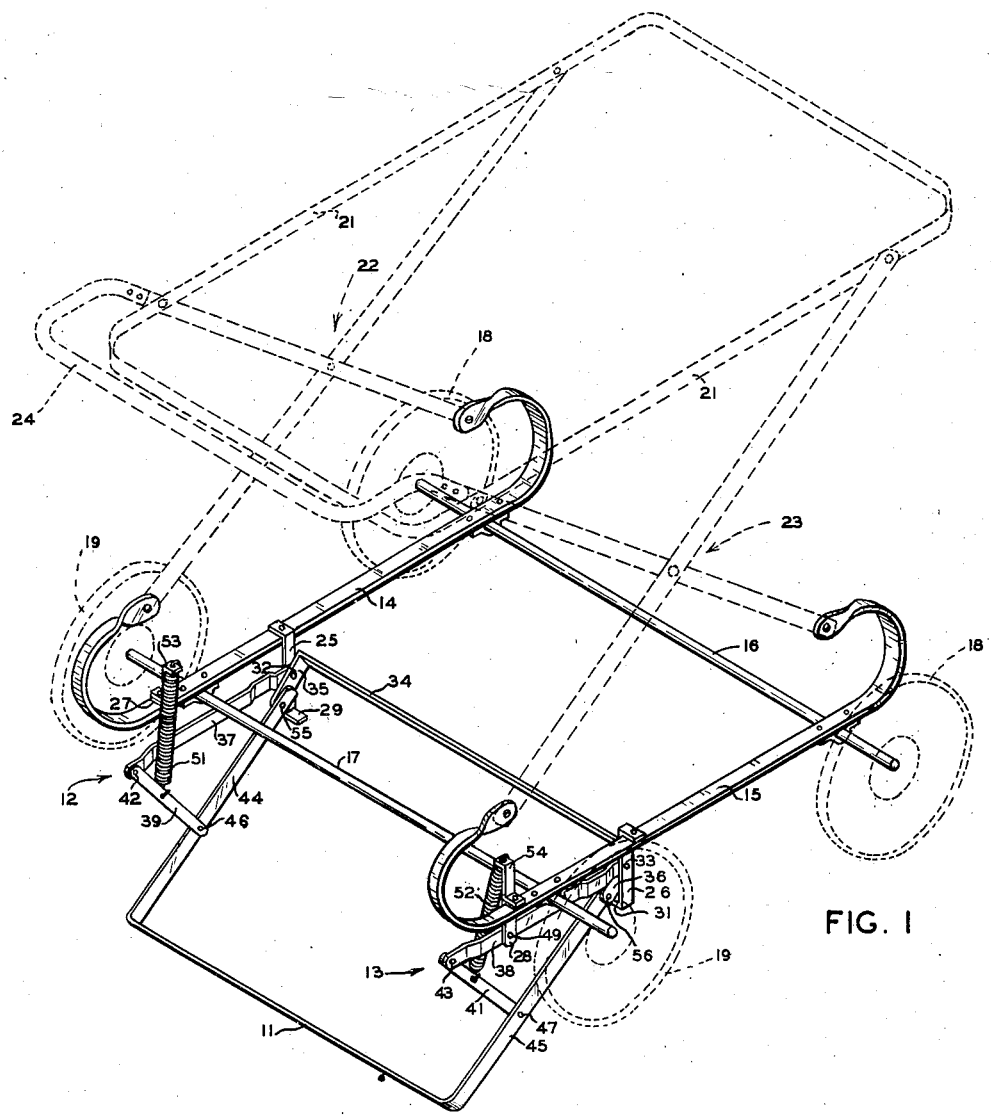
Figure 2:
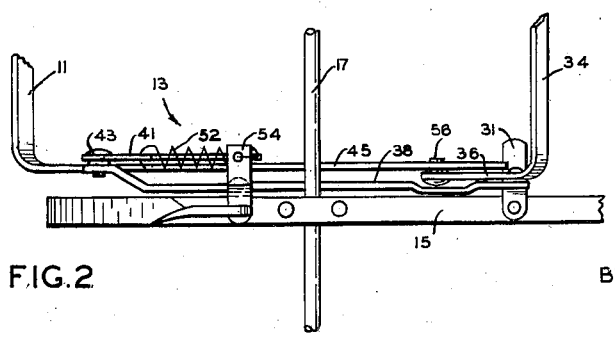
Figure 3:
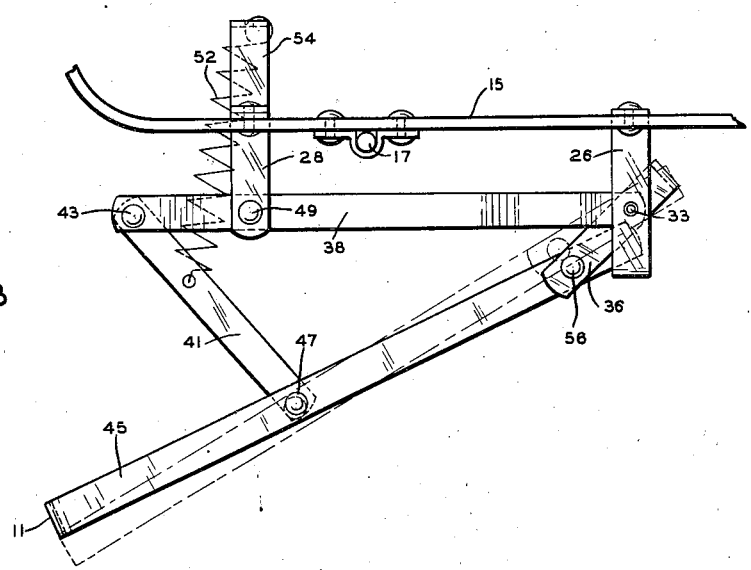
Figure 4:
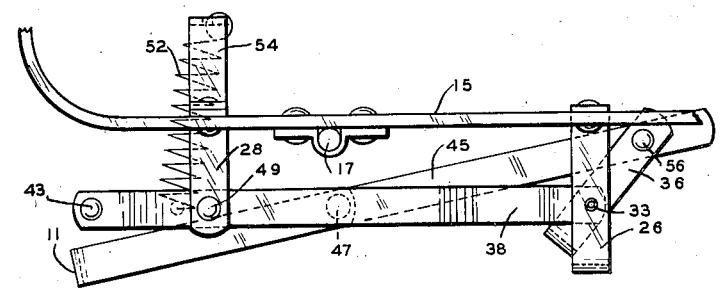

Other objects and advantages will become apparent as the description proceeds and a more comprehensive understanding of the invention will be afforded from the following detailed specification when considered in conjunction with the accompanying drawings, in which Fig. 1 is a perspective view of a baby carriage chassis showing a combined parking stand and brake embodying the invention in its preferred form and showing its mode of attachment to the said chassis, Fig. 2 is a fragmentary plan view of the parking stand and brake showing the same in its parking position, Fig. 3 is a side elevational view of the parking stand and brake showing the same in its parking and braking position, and Fig. 4 is a side elevational view of the device showing the same in its retracted position.

The device embodying the instant invention comprises a U-shaped member 11 which acts as a combined parking stand and brake when lowered to the position illustrated in Figures 1 and 3. When not in use, this member is retracted to a position shown in Figure 4.

Associated with the member 11 are two oppositely disposed mechanisms 12 and 13 which function to lock the member 11 in its parking and braking position in one instance and to hold the same in its retracted position in another instance. These mechanisms are identical as to structure, and are secured by suitable means to the chassis of a baby carriage which may be any one of the conventional types now on the market.

The baby carriage chassis, together with its super structure, forms no part of the invention, but for the sake of clarity in defining the invention it has been shown and will be described. As viewed in Fig. 1, the chassis comprises two spring members 14 and 15 to which are attached a front and a rear axle 16 and 17. On these axles are mounted two front wheels 18 and two rear wheels 19. The super structure comprises a frame 21 carried on two folding supports 22 and 23 pivotally attached thereto and to the spring members 14 and 15 as shown. A handle 24 connected to elements of the folding supports 22 and 23 completes this part of the carriage.

The entire parking stand and brake assembly is attached to the spring members 14 and 15 by two front brackets 25 and 26 and two rear brackets 27 and 28. The front brackets are formed respectively to present two stop lugs or extensions 29 and 31, and at the points 32 and 33, there is pivotally connected to these brackets a dead-center bar 34 having extensions thereon which act as two dead-center cranks 35 and 36. Also rigidly connected to the front brackets at the points 32 and 33 are two bars 37 and 38 which in turn have pivotally connected thereto two other links 39 and 41 at the points 42 and 43. The latter elements are similarly connected to two arms 44 and 45 of the member 11 at the points 46 and 47 and the links 37 and 38 are rigidly connected to the rear brackets 27 and 28 at the points 48 and 49. Two tension springs 51 and 52 are attached to the links 39 and 41 and to two brackets 53 and 54, as shown, the latter elements being mounted on the spring members 14 and 15. Further, the arms 44 and 45 of the member 11 are pivotally connected to the dead-center cranks 35 and 36 at the points 55 and 56.

In operation the combined parking stand and brake is put in its parking and braking position by placing the ball of the foot on the member 11 to press the same downwardly from its retracted position, shown in Fig. 4, until it stops against the surface on which the wheels of the carriage rest. Simultaneously with this action, the rear wheels 19 of the carriage are elevated above their supporting surface by bodily lifting the entire carriage with the handle 24 and the carriage is moved forwardly on its front wheels 18 until the stand and brake is locked in the position illustrated in Fig. 1. Here, it will be seen that the frictional engagement of the member 11 with the surface on which the carriage rests provides a positive brake for the carriage which prevents it from rolling or moving in any direction. Further, and by virtue of the fact that the member 11 extends substantially the entire width of the carriage, it will be seen that the carriage is elevated in a parked position from which it cannot be overturned by the movement of a baby within the carriage or by forces of reasonable intensity applied externally to the carriage.

From its parking and braking position, the member 11 is released and moved to its retracted position with equal ease and dispatch. All that is required is to lift the rear of the carriage by the handle 24 until the member 11 reaches a point about one inch above the surface on which it was resting and then to move the same downwardly with the ball of the foot until a release of the locking mechanism has been effected. At this time the member 11 will be moved to its retracted position and held there by the springs 51 and 52.

The manner in which the mechanisms 12 and 13 operate to perform the functions outlined in the two paragraphs next preceding, though apparent, will be described now in brief detail. When the member 11 is moved from its retracted position to its parking and braking position as above described, the dead-center cranks 35 and 36, together with the bar 34 connecting them, are rocked in a counterclockwise direction, as viewed in Fig. 4, from their full line positions as shown about the pivots 32 and 33 to their dead-center position with respect to the arms 44 and 45 of the member 11. At this point, the parts occupy their dotted line positions as illustrated in Fig. 3, the arms 44 and 45 being coextensive with the dead-center cranks 35 and 36. This condition, which is brought about by the simultaneous lifting and forward movement of the carriage while the member 11 is held downwardly by the ball of the foot, is unstable and as the lifting forces are released, the weight of the carriage, as transmitted through the various linkages, causes the cranks 35 and 36 to further rotate in a counterclockwise direction, through their dead-center position until the ends of the arms 44 and 45 rest against the stop lugs 29 and 31 as shown in Figs. 1 and 3. In this position the member 11 is locked to park and brake the carriage, the springs 51 and 52, which have been flexed, acting to facilitate such locking action in the event the rear of the carriage should be lifted from its supporting surface.

In releasing the stand and brake from its parking and braking position the rear end of the carriage is lifted as aforedescribed and the member 11 is pressed downwardly by the ball of the foot. This action causes the arms 44 and 45 to pivot about the points 46 and 47 in a counterclockwise direction as viewed in Fig. 3, which, in turn, causes the cranks 35 and 36 to rotate about the pivots 32 and 33 in a clockwise direction. After this action has continued to the point where the cranks 35 and 36 and the arms 44 and 45 have passed through dead-center, the forces of the tension springs 51 and 52, acting through the links 39 and 41 and the arms 44 and 45 cause the member 11 to be moved automatically to its retracted position as shown in Fig. 4. Thereafter the rear wheels of the carriage may be dropped to their supporting surface and the carriage is free to move on its wheels.

From the foregoing, it will be seen that the operation of the device requires only small forces which are applied by the ball of the foot, thus preventing injury to the toes or shoes of the operator. Moreover, since the release of the device can be effected only by raising the handle 24 which is out of the reach of small children, it is apparent that unwarranted operation thereof cannot be made by such irresponsible persons, thus providing complete safety for the child left in the carriage.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a combined parking stand and brake adaptable for attachment to the chassis of a baby carriage, the combination of a dead-center bar having a plurality of dead-center cranks fashioned thereon, a plurality of front and rear brackets fixed to said chassis, a plurality of bars rigidly connected in a first instance to said front brackets at points common to those at which said cranks are pivotally connected to said front brackets and in a second instance rigidly connected to said rear brackets, a parking and braking member having arms pivotally connected at their ends with the ends of said cranks, a plurality of links connecting with said bars and said arms, a plurality of springs each having one of their ends bracketed to said chassis and their other end connected substantially centrally to said links, and a plurality of stop lugs fashioned on said front brackets adapted to be engaged by ends of said arms, said dead-center bar and cranks being rotatable in a first direction upon movement of said member to a parking and braking position to lock said member in such position and rotatable in a second direction to unlock said member whereby the same is moved to a retracted position under the action of said springs.

2. In a baby carriage having a chassis, a ground brake therefor, including a crank pivoted to the chassis, a brake arm pivotally connected at its forward end to the crank and extending rearwardly to engage the ground when in operative position, a link having its upper end connected to the chassis and its lower end connected to the arm, a stop positioned to limit the downward movement of the forward end of the brake arm and thereby secure the arm in operative position, and a tension spring connected between the arm and the chassis to yieldingly hold the arm upwardly in non-engaging position.

3. In a baby carriage having a chassis, a combined brake and parking stand therefor, including a pair of cranks pivoted to the chassis, a crossbar rigidly connecting said cranks in parallel, a U-shaped brake member having its arms pivotally connected, respectively, to the cranks and extending rearwardly to engage the ground when in operative position, a pair of parallel links connected to the frame at their upper ends and to the arms of said member at their lower ends, respectively, a stop positioned to limit the downward movement of the forward ends of said arms and thereby secure the arms in operative position, and a tension spring connected between said member and the chassis to yieldingly hold said member in non-engaging position.

MATILDA D. WELSH.

REFERENCES CITED

The following references are of record in the file of this patent:

UNITED STATES PATENTS

| Number | Name | Date |
|---|---|---|
| 1,591,581 | Trejo | July 6, 1926 |
| 2,100,036 | Michal | Nov. 23, 1937 |